(12) United States Patent
Shinohara et al.

(10) Patent No.: US 7,639,279 B2
(45) Date of Patent: Dec. 29, 2009

(54) IMAGE MANAGEMENT SYSTEM

(75) Inventors: Mamoru Shinohara, Kanagawa-ken (JP); Yoichi Nakamura, Kanagawa-ken (JP); Hiroshi Yamaguchi, Kanagawa-ken (JP); Jun Enomoto, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 518 days.

(21) Appl. No.: 10/974,811

(22) Filed: Oct. 28, 2004

(65) Prior Publication Data
US 2005/0093986 A1 May 5, 2005

(30) Foreign Application Priority Data
Oct. 30, 2003 (JP) ............... 2003-370447

(51) Int. Cl.
*H04N 5/232* (2006.01)
*G03B 17/00* (2006.01)

(52) U.S. Cl. ..................... 348/211.3; 396/56

(58) Field of Classification Search .............. 348/208.1, 348/239, 238, 207.99, 211.3, 211.99, 211.1, 348/211.12, 231.2, 231.1; 707/1; 725/114; 396/59; 445/456.1
See application file for complete search history.

(56) References Cited

U.S. PATENT DOCUMENTS

| 6,591,068 | B1 * | 7/2003 | Dietz | 396/429 |
|---|---|---|---|---|
| 6,628,899 | B1 * | 9/2003 | Kito | 396/56 |
| 7,161,622 | B1 * | 1/2007 | Oinoue | 348/211.1 |
| 7,472,134 | B2 * | 12/2008 | Kaku | 707/104.1 |
| 2002/0001468 | A1 | 1/2002 | Kaku | |
| 2002/0049728 | A1 * | 4/2002 | Kaku | 707/1 |
| 2002/0072924 | A1 * | 6/2002 | Gray | 705/1 |
| 2003/0229619 | A1 * | 12/2003 | Kinoshita et al. | 707/1 |
| 2004/0080653 | A1 * | 4/2004 | Tanaka et al. | 348/333.01 |
| 2006/0056832 | A1 * | 3/2006 | Yamaguchi et al. | 396/56 |
| 2006/0059528 | A1 * | 3/2006 | Katayama et al. | 725/114 |

FOREIGN PATENT DOCUMENTS

| JP | 11-175694 | 7/1999 |
|---|---|---|
| JP | 11-215421 A | 8/1999 |

* cited by examiner

*Primary Examiner*—Nhan T Tran
*Assistant Examiner*—Ahmed A Berhan
(74) *Attorney, Agent, or Firm*—Birch, Stewart, Kolasch & Birch, LLP

(57) ABSTRACT

A user can easily preview image data obtained by photography in a facility such as a theme park and an entertainment facility and can place an order on the image data during the stay in the facility. A service server stores the image data obtained by photography of the user by a photography system, by relating the image data to the user ID of the user. When the user instructs the service server to display the image data for preview via a communication apparatus, the service server sends the image data to a PDA via the communication apparatus. The user displays the image data on the PDA and can preview and edit the image data, and can place a printing order.

17 Claims, 14 Drawing Sheets

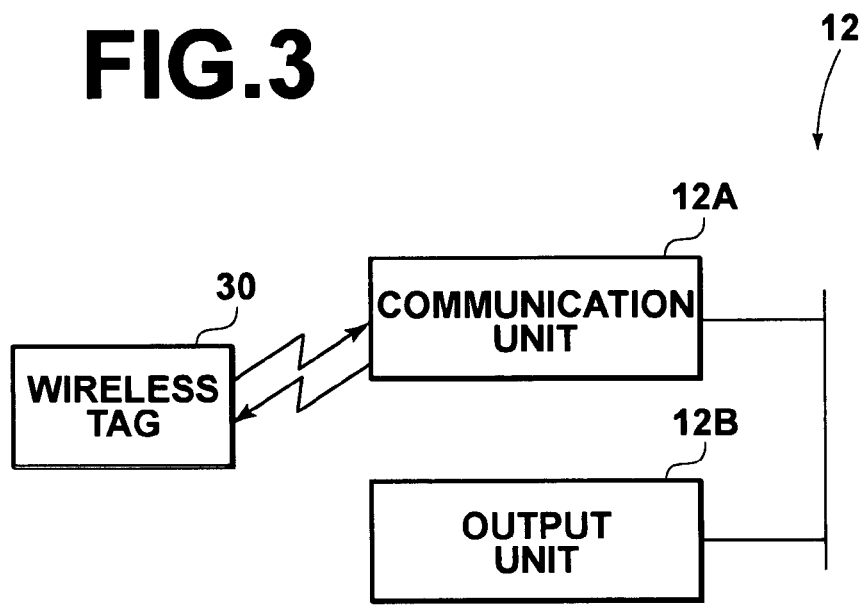
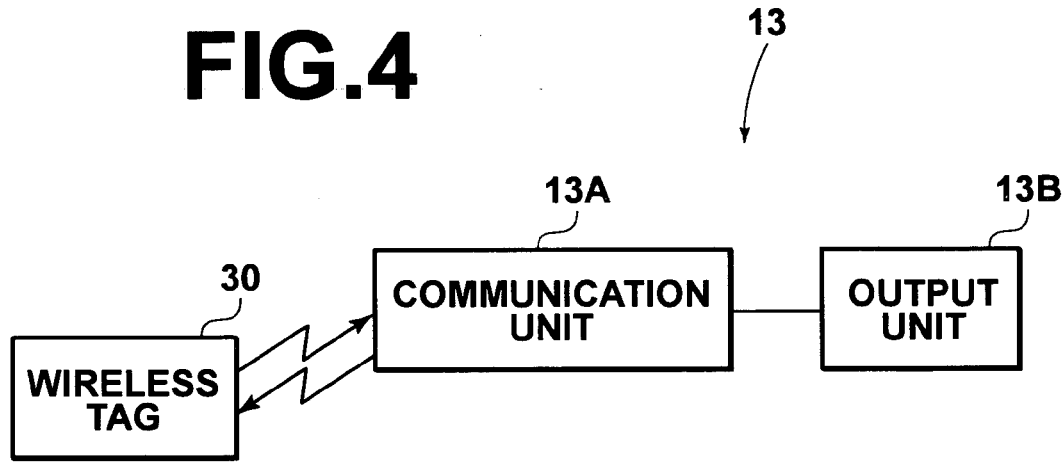

| SPECIFIC USER ID | REQUESTER ID |
|---|---|
| 0123 | 0124 |
| 0005 | 0765 |
| 0012 | 0010 |

FIG.9

| NAME OF LOST ITEM | USER ID | FOUND OR NOT FOUND |
|---|---|---|
| WALLET | 0010 | × |
| RING | 0765 | ○ |
| CREDIT CARD | 0825 | × |

FIG.10

IMAGE MANAGEMENT SYSTEM

BACKGROUND OF THE INVENTION

1. Field of the Invention

The present invention relates to an image management system for photographing a customer as a visitor to a facility, such as a theme park, by using photography means, such as a camera installed at a fixed location, and for managing an image thereof.

2. Description of the Related Art

A printing system has recently been proposed for photographing a visitor to an entertainment facility, such as a theme park, by using a camera fixed in an attraction, and for providing a print of image data obtained by the photography to the visitor. In such a printing system, a print is provided to a visitor at each attraction he/she visited. Therefore, a visitor needs to wait for a print at each attraction, which is troublesome.

For this reason, a system has been proposed for providing to a visitor a wireless tag, such as a wireless IC card, recorded with ID information of the visitor and for photographing the visitor by fixed cameras installed in a theme park (see U.S. Pat. No. 6,628,899). In this system, the ID information is sent at the time of photography from the wireless tag to communication devices installed with the fixed cameras. Image data obtained by the photography are stored in an image server by being related to the ID information. Therefore, the visitor can access the image server later, and can collectively view his/her images obtained in the theme park by searching for the image data based on the ID information. In this manner, troubles caused by waiting for a print at each attraction can be eased. Furthermore, in the system described in U.S. Pat. No. 6,628,899, a visitor can operate each of the fixed cameras by using the wireless tag for photography of himself/herself looking at the camera.

In addition, another photography system has also been proposed in Japanese Unexamined Patent Publication No. 11 (1999)-215421. In this system, a remote control is used to operate a fixed camera installed in a theme park, and image data obtained by photography are printed after being classified according to the remote control. The image data can also be sent to the remote control for preview. According to this system, an image can be confirmed immediately after photography.

Moreover, still another system has also been proposed in U.S. patent Laid-Open No. 20020049728. In this system, image data obtained by a camera installed in a theme park are stored in an image server and image data having high probability of including a subject are searched for through recognition of the subject based on personal information, such as a face image for identifying the subject in an image. Furthermore, yet another system has been proposed for identifying a position of a subject and for searching for image data obtained by a camera installed correspondingly to the position as image data having high probability of including the subject (see U.S. Patent Laid-Open No. 20020001468).

In the photography systems described above, a visitor needs to visit a place in a facility where an image display terminal is installed in the case where the visitor wishes to view image data obtained by photography during his/her visit thereto to confirm the image data, to order printing of the image data, to delete of an unnecessary image, and to perform image processing on the image data, for example. Therefore, viewing image data in this manner is troublesome. According to the photography system described in Japanese Unexamined Patent Publication No. 11 (1999)-215421, although a visitor can preview image data obtained by photography, images can only be previewed immediately after photography. In this system, all image data obtained by photography are printed. Therefore, some of the prints generated in this manner are not necessary in some cases.

SUMMARY OF THE INVENTION

The present invention has been conceived based on consideration of the above circumstances. An object of the present invention is therefore to enable easy preview and printing order for image data obtained by photography in a facility such as a theme park and an entertainment facility during the visit to the facility.

An image management system of the present invention comprises:

photography means for receiving identification information and for obtaining an image by photographing a customer visiting a facility. The identification information is sent from identification information transmission means that transmits the identification information for identifying the customer and is held by the customer. The image management system also comprises:

image management means connected to the photography means, for storing the image obtained by the photography means by relating the image to the identification information and for carrying out management of the image including at least one of editing, transmission, and printing of the image; and a plurality of communication means installed in a plurality of places in the facility, for sending and receiving various kinds of information including the image and the identification information by communicating by radio with a mobile terminal that carries out at least one of editing of the image, ordering editing of the image, and placing a printing order for the image while being held by the customer. The mobile terminal includes display means and terminal communication means. The display means receives the identification information sent from the identification information transmission means and displays various kinds of information including the image. The terminal communication means sends and receives the various kinds of information including the image by radio. The image management system also comprises:

control means for controlling the image management means and the communication means so that the management of the image stored in the image management means is carried out according to an instruction from the mobile terminal.

The editing refers to any processing related to changing and storing of the image. For example, image enhancement processing on the image, deletion of the image if the image is unnecessary, and attachment of the image to an e-mail message can be listed as the editing.

The mobile terminal refers to any terminal comprising the display means and the terminal communication means that can communicate by radio. More specifically, the mobile terminal refers to a PDA or a mobile phone. A small notebook computer can also be included in the mobile terminal if the computer can be carried around.

The communication by radio refers to communication using a mobile phone communication network, a wireless LAN, or a short-range wireless communication network such as Bluetooth, for example.

The image management system of the present invention may further comprise service information storage means for storing service information on various kinds of services to be provided to the customer. In this case, the control means also controls the service information storage means and the communication means to obtain the service information related to any part of the services desired by the customer from the service information storage means, in response to an instruction from the mobile terminal and to send the service information to the mobile terminal that sent the instruction.

The service information refers to information of high value to the customer, such as information for guiding the customer through the facility like a theme park, in which the image management system of the present invention is installed, information on congestion of an attraction or a restaurant in the facility, and information necessary for reserving an attraction or a restaurant, for example.

The image management system of the present invention may further comprise specific identification information registration means for registering specific identification information specified by the customer and sent from the mobile terminal. In this case, if any one of the communication means or the photography means receives the specific identification information, the control means controls the communication means so as to send information on the reception of the specific identification information to the mobile terminal that sent the specific identification information, together with location information representing a location of the communication means or the photography means that received the specific identification information.

The image management system of the present invention may also comprise lost-item registration means for registering lost-item information representing a lost item of the customer sent from the mobile terminal by relating the lost-item information to the identification information of the customer, together with information on whether or not the lost item has been found. In this case, if the lost item is found, the control means controls the communication means so as to send information representing the finding to the mobile terminal that sent the lost-item information.

According to the present invention, the photography means receives the identification information transmitted by the identification information transmission means held by the customer and photographs the customer. An image obtained by photography is then stored in the image management means by being related to the identification information. When the customer carries out at least one of editing of the image, ordering editing of the image, or placing a printing order by using the mobile terminal, communication means receives the instruction from the mobile terminal and the image management means manages the image according to the instruction from the mobile terminal. Since the communication means for communicating with the mobile terminal are installed at the plurality of places in the facility, the customer in the facility can display the image obtained by photography, edit the image, and place an order for a print by using his/her mobile terminal during the visit to the facility without troublesome moving for the communication means, as long as communication with the communication means is available.

If the image management system comprises the service information storage means for storing the service information on the services to be provided to the customer, the service information he/she wishes to obtain can be sent to the mobile terminal in response to the instruction from the mobile terminal. In this manner, the customer can obtain the service information provided by the facility at any place in the facility as long as communication with the communication means is available.

If the image management system comprises the specific identification information registration means, when any one of the communication means or the photography means receives the specific identification information registered with the specific identification information registration means, the information on reception of the specific identification information is sent to the mobile terminal that sent the specific identification information, together with the location information of the communication means or the photography means that received the specific identification information. The communication means to communicate with the mobile terminal are located in the plurality of places in the facility. Therefore, if the customer who visited the facility with his/her family lets his/her child have the identification information transmission means and registers the identification information transmitted by the identification information transmission means held by his/her child as the specific identification information with the specific identification information registration means in the case where the child is missing, the customer can easily find the child who lost his/her way in the facility.

If the image management system comprises the lost-item information registration means, the lost-item information representing the lost item of the customer and the information on whether or not the lost item has been found is registered with the lost-item information registration means by being related to the identification information of the customer. When the lost item is found, the information on the finding is sent to the mobile terminal that sent the lost-item information. In this manner, the customer can be notified of the finding. When the lost item is handed to the customer, the customer can be easily recognized as the person who lost the item by comparison of the identification information of the customer who registered the lost-item information with the identification information of the customer who came to receive the item.

BRIEF DESCRIPTION OF THE DRAWINGS

FIG. 3 is a block diagram showing a configuration of a wide-range sensor;

FIG. 4 is a block diagram showing a configuration of a communication device;

FIG. 9 shows specific user ID registered with a memory;

FIG. 10 shows lost-item information registered with the memory;

DESCRIPTION OF THE PREFERRED EMBODIMENT

Figure 1:
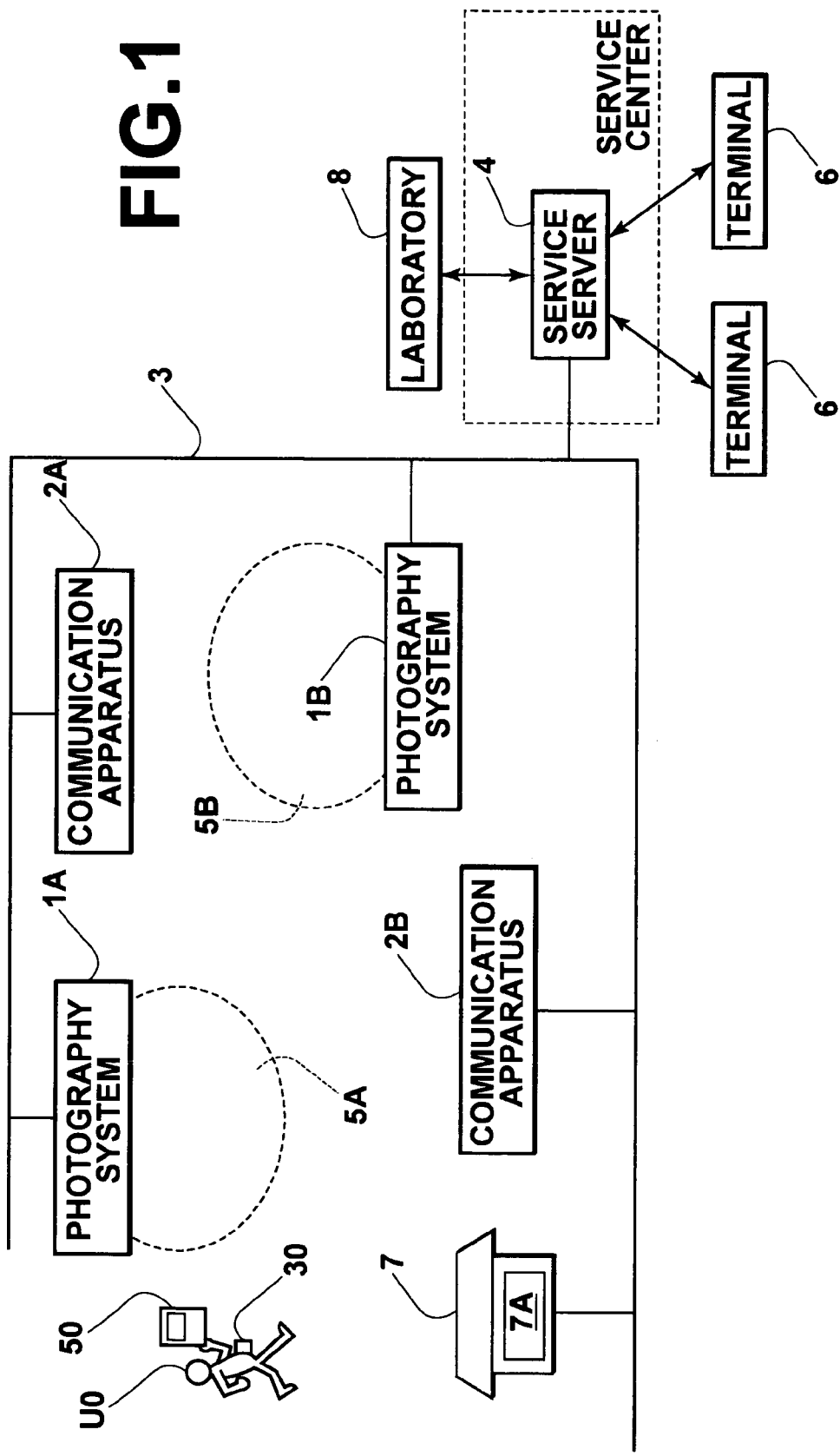
FIG. 1 is a block diagram showing a configuration of an image management system of an embodiment of the present invention.

Hereinafter, an embodiment of the present invention will be described with reference to the accompanying drawings. FIG. 1 is a block diagram showing a configuration of an image management system in this embodiment. As shown in FIG. 1, the image management system in this embodiment is installed in a theme park. The image management system comprises a plurality (2 in this case) of photography systems 1A and 1B, a plurality (2 in this case) of communication apparatuses 2A and 2B, and a service server 4. The photography systems 1A and 1B are installed in the theme park and obtain image data sets S1 representing a visitor to the theme park as a subject (hereinafter referred to as a user U0) by photographing the user U0. The communication apparatuses 2A and 2B communicate with a wireless tag 30 and a PDA 50 held by the user U0. The service server 4 is installed in a service center in the theme park and connected to the photography systems 1A and 1B and to the communication apparatus 2A and 2B via a network 3. The service server 4 is also connected to a terminal 6 such as a personal computer, a mobile phone, or a PDA owned by the user U0 and to a laboratory 8 via the network 3. The laboratory 8 prints the image data sets S1, generates a photo album, and records the image data sets S1 in a CD-R, for example. The service server 4 is also connected to a terminal 7A installed in a restaurant 7 or an attraction in the theme park via the network 3.

The user U0 is photographed by the photography systems 1A and 1B by moving around in the theme park while holding the wireless tag 30 (acting as identification information transmission means). The user U0 communicates with the communication apparatuses 2A and 2B by using the PDA 50. In this manner, the user U0 instructs the service server 4 to send the image data sets S1, and receives service information from the service server 4.

The photography systems 1A and 1B are also installed in places from which an attraction and a restaurant in the theme park can be photographed. In this embodiment, the photography system 1B is installed in a place where photography of a queue for an attraction or a restaurant can be photographed.

The wireless tag 30 is provided to the user U0 at the time the user U0 enters the theme park. When the wireless tag 30 is provided to the user U0, the face of the user U0 is photographed, and properties of the user U0, such as the name, the address, age, gender, height, and the name of his/her child, are also registered with the service server 4 together with a face image of the user U0. An e-mail address by which the PDA 50 can receive an e-mail message is also registered with the service server 4. The wireless tag 30 stores user ID (identification information) for identifying the user U0, as will be described later. In the case where the user U0 visited the theme park with his/her family, the other family member or members are also provided with the wire less tags 30. In this case, the user ID or IDs of the family member or members include a character string or figure string specific to the family. The user IDs of all the family members are printed on paper or the like, and the paper is provided to the representative of the family.

Figure 2:
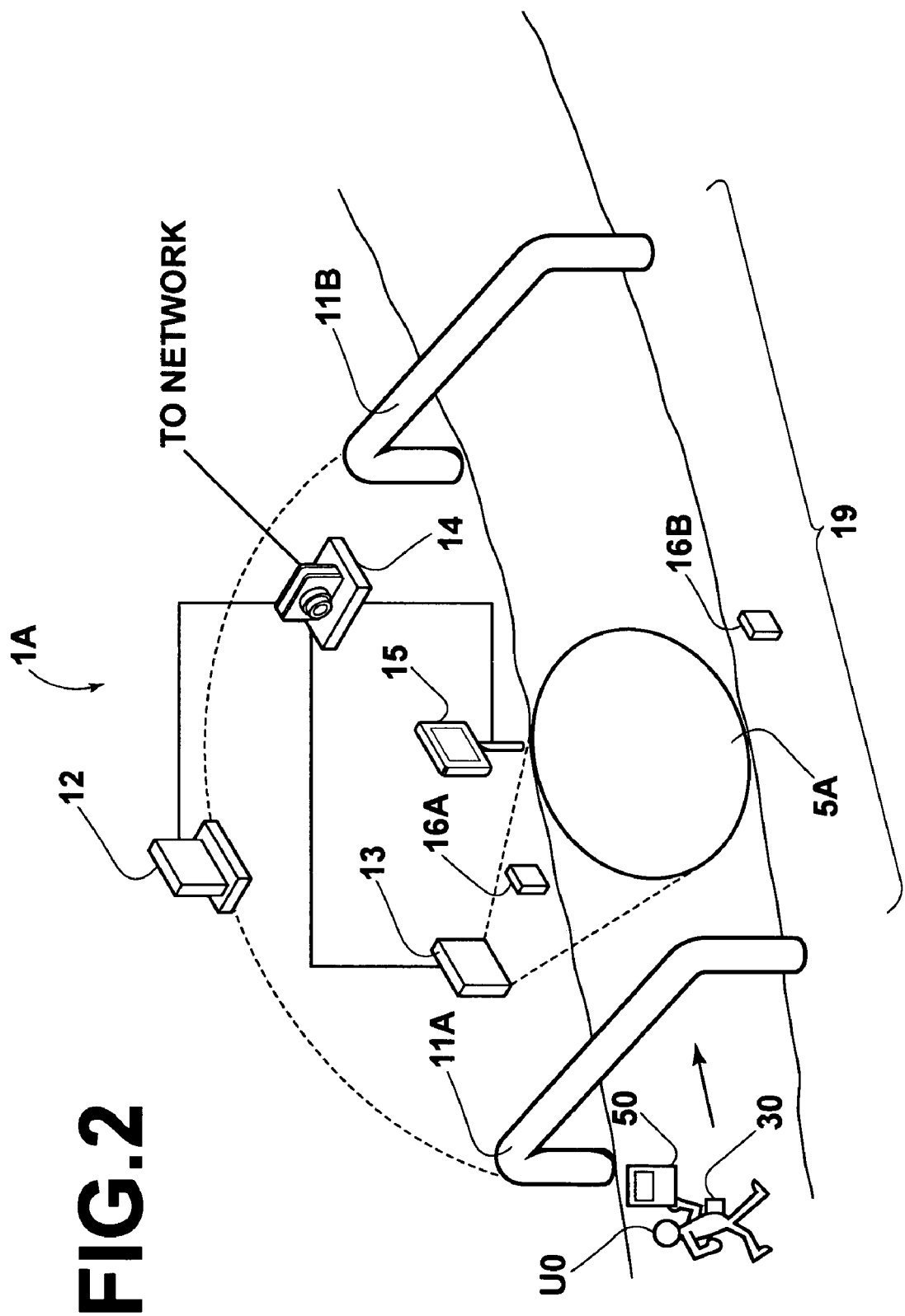
FIG. 2 is a schematic perspective view showing a configuration of a photography system.

FIG. 2 is a perspective view showing a configuration of the photography systems. Since the photography systems 1A and 1B have the same configuration, only the photography system 1A is described below. As shown in FIG. 2, the photography system 1A photographs the users U0 in a photography range 5A in the theme park. The photography system 1A comprises gates 11A and 11B for counting the number of visitors entering an area 19, a wide-range sensor 12 for counting the number of the users U0 holding the wireless tags 30 in the area 19 between the gates 11A and 11B, a communication device 13 for communicating with the users U0 having the wireless tags 30 in the photography range 5A, a photography device 14 for photographing the users U0, and human sensors 16A and 16B comprising an infrared sensor and an ultrasonic sensor for detecting the users U0 in the photography range 5A for photography of the users U0 by the photography device 14.

The gates 11A and 11B count the number of visitors entering the area 19, regardless of possession or non-possession of the wireless tags 30. The number counted by the gates is input to a system that is not shown but installed in the theme park together with the service server 4, and is used for understanding how many visitors have entered the area 19. The number is also input to the photography device 14 as information representing the number of visitors, and used for controlling photography.

The gates 11A and 11B can have any arbitrary configuration as long as the number of visitors is counted. For example, the gates may count the number by using an electric light, or by using a revolving bar turned by the visitors upon entering.

The wide-range sensor 12 detects the users U0 having the wireless tags 30 in the area 19. FIG. 3 is a block diagram showing a configuration of the wide-range sensor 12. As shown in FIG. 3, the wide-range sensor 12 comprises a communication unit 12A and an output unit 12B. The communication unit 12A transmits an inquiry signal representing inquiry information at predetermined intervals, and receives a reply signal from each of the wireless tags 30. The output unit 12B outputs a signal representing reception of the reply signal and reply information represented by the reply signal to the photography device 14.

The wide-range sensor 12 counts the number of the users U0 having the wireless tags 30 in an attraction 10.

The communication device 13 communicates with the users U0 respectively having the wireless tags 30 in the photography range 5A. FIG. 4 is a block diagram showing a configuration of the communication device 13. As shown in FIG. 4, the communication device 13 comprises a communication unit 13A and an output unit 13B. The communication unit 13A transmits an inquiry signal representing inquiry information at predetermined intervals, and receives a reply signal and a photography instruction signal from each of the wireless tags 30. The output unit 13B outputs reply information represented by the reply signal received by the communication unit 13A to the photography device 14.

The reply information, represented by the reply signal from each of the wireless tags 30, includes the user ID for identifying the corresponding user U0. The user ID is a number specific to each of the users U0. The user ID may be a number pre-stored in the wireless tag 30, or may be stored in the wireless tag 30 as a number or symbols desired by the user U0 at the time of provision of the wireless tag 30 to the user U0. In the case where the family member or members of the user U0 are also provided with the wireless tag or tags 30, the user ID stored in each of the wireless tags 30 may be random or may include a number or symbols that are common among the family.

Figure 5:
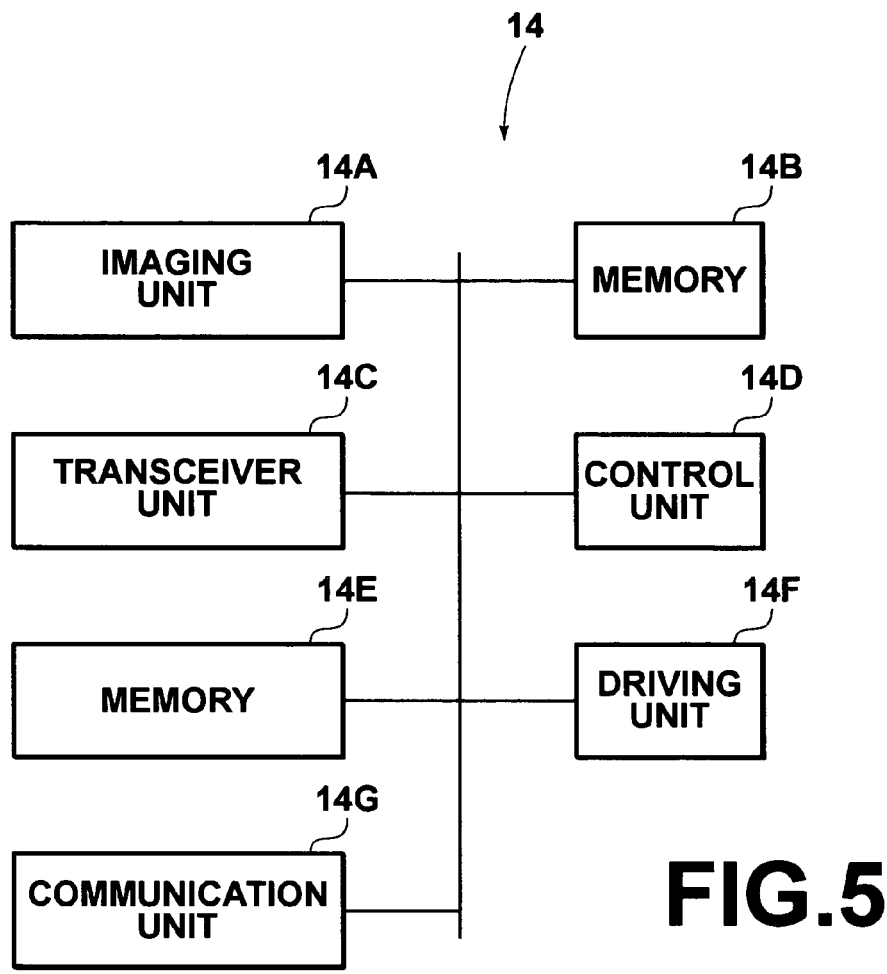
FIG. 5 is a block diagram showing a configuration of a photography device.

FIG. 5 is a block diagram showing a configuration of the photography device 14. As shown in FIG. 5, the photography device 14 comprises a digital camera. The photography device 14 has an imaging unit 14A, a first memory 14B, a transceiver unit 14C, a control unit 14D, a second memory 14E, a driving unit 14F, and a communication unit 14G. The imaging unit 14A obtains the image data sets S1 by photography. The first memory 14B temporarily stores the image data sets S1. The transceiver unit 14C sends and receives signals to and from the gates 11A and 11B, the wide-range sensor 12, the communication device 13, the display device 15, and the human sensors 16A and 16B. The control unit 14D controls the photography device 14. The second memory 14E stores a control program and various kinds of information. The driving unit 14F is used for panning and tilting the imaging unit 14A. The communication unit 14G is connected to the network 3.

In the photography device 14, the control unit 14D puts the imaging unit 14A on stand-by for photography, based on information sent from the wide-range sensor 12 to the photography device 14 for representing reception of the reply signal by the wide-range sensor 12. More specifically, the control unit 14D switches on the imaging unit 14A or cancels a sleep mode of the imaging unit 14A in the case where the imaging unit 14A has been turned off or the imaging unit 14A has been in the sleep mode to save power consumption. In the case where the imaging unit 14A has already been turned on or not in the sleep mode, the control unit 14D maintains the current state of the imaging unit 14A.

The photography device 14 selects an appropriate one of photography modes by understanding the number of visitors in the area 19 according to the information representing the number of visitors counted by the gates 11A and 11B. More specifically, the control unit 14D compares the number with a threshold value Th1. In the case where the number is smaller than the threshold value Th1 and appropriate for automatic photography, the control unit 14D causes the imaging unit 14A to be in an automatic photography mode. In the case where the number is not smaller than the threshold value Th1 and identification of each of the users U0 becomes difficult for photography, the control unit 14D changes the photography mode of the imaging unit 14A to temporarily suspend photography.

In the case where the number is not smaller than the threshold value Th1, a plurality of the users U0 having the wireless tags 30 may be present in the photography range 5A, which makes identification of a specific one of the users U0 difficult. Therefore, the photography mode may be changed to a manual photography mode that enables manual photography through operation of the wireless tag 30 by each of the users U0. In this case, the photography device 14 sends an instruction signal to the display device 15 to instruct the user U0, who is going to be photographed, to carry out photography. Since the reply information represented by the reply signal sent from each of the wireless tags 30 has the user ID, the photography mode may be changed to a mode for photographing the user U0 by calling the user U0 from the display device 15 based on the user ID, or to a mode for carrying out photography after telling other visitors to leave the photography range 5A. In this embodiment, the photography mode is changed to the manual photography mode. In the manual photography mode, the user U0 may be called in a language registered by the user U0 with a user database DB2.

In the manual photography mode and in the photography mode for carrying out photography after calling the user U0, the user U0 needs to be notified of photography. Therefore, the control unit 14D accesses the service server 4, and obtains information representing the name of the user U0 by referring to the user database DB2 that will be described later according to the user ID included in the reply information. The control unit 14D causes the display device 15 to call the name of the user U0 as will be described later.

The photography device 14 sends to the service server 4 the reply information represented by the reply signal from the communication device 13 and the image data set S1 obtained by photography from the communication unit 14G. The image data set S1 may be sent to the display device 15 to be displayed thereon.

The photography device 14 understands where the user U0 is in the photography range 5A, based on the signal sent from the human sensors 16A and 16B. The photography device 14 pans and tilts the imaging unit 14A by using the driving unit 14F so that the user U0 is captured in a view angle of the imaging unit 14A.

The image data set S1 obtained by the photography device 14 is sent to the service server 4, together with the reply information represented by the reply signal, information on time and date of photography, and location information representing where the photography system 1A is located. The above-described information may be sent from the communication device 13 to the service server 4 in the form of a file separate from the image data set S1 or together with the image data set S1 by being described in a tag thereof. In this embodiment, the information is described in the tag of the image data set S1.

Figure 6:
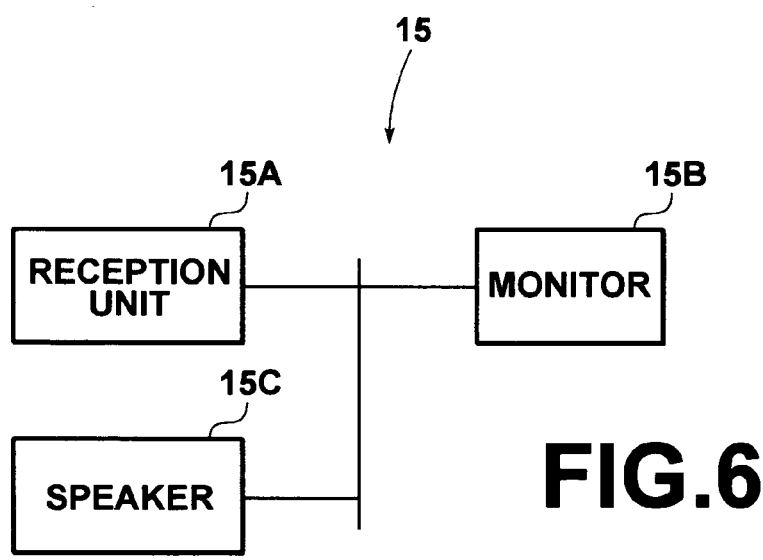
FIG. 6 is a block diagram showing a configuration of a display device.

FIG. 6 is a block diagram showing a configuration of the display device 15. As shown in FIG. 6, the display device 15 comprises a reception unit 15A for receiving the image data set S1 and instruction signals representing various instructions from the photography device 14, a monitor 15B for displaying the image data set S1 and the various instructions, and a speaker 15C for outputting voice for instructing the user U0 to act for photography based on the instruction signals.

In the case where the user U0 is called, as in the case of the manual photography mode or the mode for carrying out photography after calling the user U0, the photography device 14 instructs the display device 15 to output the voice by which the user U0 is identified, such as "Tommy, we are going to photograph you" or "Annie, please press the photography button", for example. The language therefore is selected with reference to the user database DB2 stored in the service server 4 according to the user ID.

The human sensors 16A and 16B detect the position of the user U0 in the photography range 5A, and send a position signal representing the position to the photography device 14 for panning and tilting the imaging unit 14A. In this embodiment, the number of the human sensors is two. However, three or more human sensors may be used for improving accuracy of detecting the position of the user U0.

Figure 7:
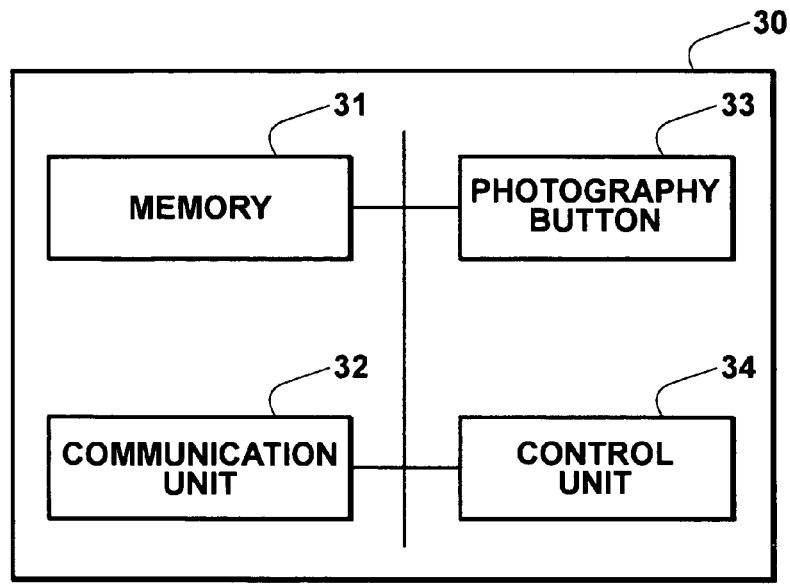
FIG. 7 is a block diagram showing a configuration of a wireless tag.

FIG. 7 is a block diagram showing a configuration of the wireless tag 30. As shown in FIG. 7, the wireless tag 30 comprises a memory 31, a communication unit 32, a photography button 33, and a control unit 34. The memory 31 stores the user ID for identifying the user U0 holding the wireless tag 30. The communication unit 32 receives the inquiry signal and sends the reply signal representing the reply information including the user ID and the photography instruction signal. The photography button 33 is used for photography instruction in the manual photography mode. The control unit 34 controls operation of the wireless tag 30. The wireless tag 30 is formed to have a card-like shape so that the user U0 can easily carry the tag. When the photography button 33 is pressed, the photography instruction signal is sent from the communication unit 32 to the communication device 13 for photography instruction.

As an example of the wireless tag 30, a long-range RFID tag having a battery inside and communicable within several meters may be used. The wireless tag 30 is distributed to the user U0 who wishes to be photographed by the photography system 1A. At this time, the name, the address, the phone number, and the like of the user U0 are registered with the user database DB2 in the service server 4. Therefore, the name of the user U0 can be identified and the voice identifying the user U0 can be output from the display device 15 at the time of photography, as has been described above.

Figure 8:
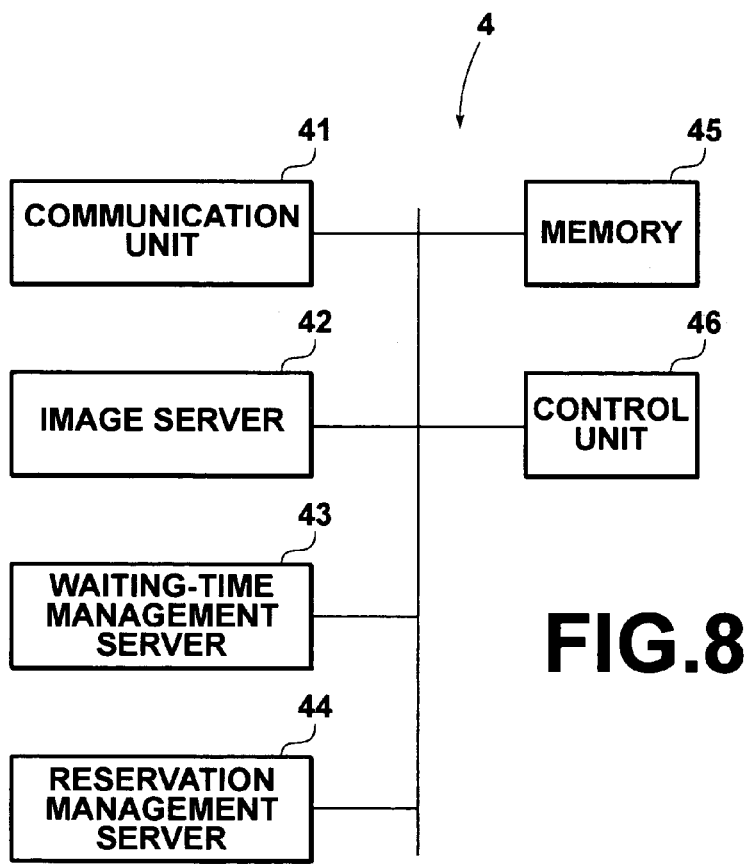
FIG. 8 is a block diagram showing a configuration of a service server.

FIG. 8 is a block diagram showing a configuration of the service server 4. As shown in FIG. 8, the service server 4 comprises a communication unit 41, an image server 42, a waiting-time management server 43, a reservation management server 44, a large-capacity memory 45 (acting as service information storage means, specific identification information registration means, and lost item registration means), and a control unit 46. The communication unit 41 communicates via the network 3 with the photography systems 1A and 1B, the communication apparatuses 2A and 2B, the terminal 6 owned by the user U0, the terminal 7A in the restaurant and the like, and the laboratory 8. The image server 42 stores the image data sets S1. The large-capacity memory 45 stores a program for operating the service server 4 and various kinds of information such as the user database relating the user ID with user information, for example. The control unit 46 controls the operation of the service server 4.

The image server 42 stores the image data sets S1 sent from the photography systems 1A and 1B by relating the image data sets S1 to the user IDs of the users U0 represented by the image data sets S1. More specifically, each of the image data sets S1 is related to the corresponding user ID by the tag thereof describing the user ID of the user U0 sent from the photography system 1A or 1B. The image server 42 classifies the image data sets S1 according to the users U0, based on the user IDs of the users U0 described in the tags of the image data sets S1. Furthermore, the image server 42 stores an image database generated by sorting the image data sets S1 in order of photography, based on the information on time and date of photography described in the tags of the image data sets S1.

In response to an instruction from the PDA 50 held by any one of the users U0, the image server 42 can send the corresponding image data sets S1 to the PDA 50, delete the corresponding image data sets S1, send the corresponding image data sets S1 to a specified addressee in the form of attachment to an e-mail message, carry out image processing on the corresponding image data sets S1, and receive a printing order sent from the PDA 50 by the user U0, as will be described later. In the case of reception of a printing order, the image server 42 sends order information representing the content of the order, such as quantity and size of prints input from the PDA 50, to the laboratory 8 together with the corresponding image data sets S1, to cause the laboratory 8 to carry out printing as specified.

The waiting-time management server 43 extracts human images from an image of a queue for an attraction or a restaurant photographed by the photography system 1B according to a method described in Japanese Unexamined Patent Publication No. 11 (1999)-175694, for example. The waiting-time management server 43 then finds the number of people based on the extracted images, and traces a person selected from the extracted images. The waiting-time management server 43 calculates a waiting time based on time necessary for the person to move a predetermined distance, and stores the calculated time therein. The waiting-time management server 43 causes the photography system 1B to photograph regularly, and updates the waiting time at predetermined intervals.

The reservation management server 44 manages the face images of the users U0 photographed at the time of provision of the wireless tags 30 to the users U0, by relating the face images to the user IDs. More specifically, each of the face images is related to the user ID by writing the user ID in a tag of the image data set representing the face image. The reservation management server also manages reservation information such as the type of a restaurant reserved by any one of the users U0, the reserved time, and the number of people, in relation to the user ID of the user U0 who made the reservation by using the PDA 50.

In the case where the user U0 arrives the restaurant he/she reserved, the terminal 7A of the restaurant sends the user ID of the user U0 to the service server 4. The reservation management server 44 in the service server 4 sends the face image of the user U0 corresponding to the user ID to the terminal 7A. The face image is displayed on the terminal 7A, and is used for authentication of the user U0.

The memory 45 stores the service information such as information on a path of each of the users U0 in the theme park, information on location and time of character appearance, information on a special event currently held in the theme park, and information on entrance control for an attraction according to height and body condition. The memory 45 stores an address database in which the user IDs are related to the e-mail addresses, at which the PDAs held by the users U0 represented by the user IDs can receive an e-mail message.

The control unit 46 manages the waiting-time management server 43 and the reservation management server 44. The control unit 46 can provide to the users U0 services such as display of vacancy and waiting time of a restaurant in the theme park and reservation thereof, notification of order reception and finish of an image photographed in the theme park, a search for a missing child, a search for a lost item, and display of waiting time for an attraction and reservation thereof.

The control unit 46 refers to the memory 45, the waiting time management server 43, or the reservation server 44 in response to an instruction sent from the PDA of any one of the users U0 for the service information desired by the user U0, and sends the corresponding service information to the PDA of the user U0 in the form of an e-mail message.

When any one of the PDAs 50 or the terminal 6 accesses the service server 4, the control unit 46 of the service server 4 searches the image database based on the user ID input from the PDA 50 or the terminal 6 by the user U0, and permits the PDA 50 or the terminal 6 to view the image data sets S1 classified by the user ID. The user U0 can preview the image data sets S1, delete any part thereof, carry out image processing thereon, and place a printing order from the service server 4, by using the PDA 50 or the terminal 6.

In order to provide the service of searching for a missing child to any one of the users U0, the control unit 46 receives the user ID stored in the wireless tag 30 held by the family of the user U0 (hereinafter referred to as specific user ID) from the PDA 50 of the user U0, and stores the specific user ID in the memory 45. FIG. 9 shows the specific user ID stored in the memory 45. As shown in FIG. 9, the memory 45 stores the specific user ID in relation to the user ID stored in the wireless tag 30 of the user U0 who requested the missing child search (hereinafter referred to as requester ID). The control unit 46 instructs the communication apparatuses 2A and 2B, and the communication devices 13 of the photography systems 1A and 1B to notify the service server 4 of reception of the specific user ID from the wireless tag 30 storing the specific user ID, in the case of reception of the specific user ID. When the service server 4 is notified of the reception, the control unit 46 refers to the address database and sends information notifying the reception in the form of an e-mail message to the PDA 50 held by the user U0 who registered the specific user ID.

In order to provide the lost-item search service, the control 46 receives lost-item information representing a lost item of any one of the users U0 from the PDA 50 thereof. The control unit 46 stores the lost-item information in the memory 45 by relating the lost-item information to the user ID of the user U0. The lost-item information is stored in the memory 45 together with information representing whether or not the item has been found. FIG. 10 shows the lost-item information stored in the memory 45. As shown in FIG. 10, the lost-item information comprises the name of the lost item, the user ID of the user U0 who registered the lost-item information, and the information on whether or not the item has been found. In FIG. 10, ○ represents that the item has been found while X represents that the item has not been found. The control unit 46 regularly refers to the lost-item information. In the case where the lost-item information shows that the item has been found (that is, ○ is included in the information), the control unit 46 refers to the address database and sends information on the finding in the form of an e-mail message to the PDA 50 held by the user U0.

When the user U0 receives the lost item, a clerk in the service center wherein the lost item has been managed refers to the reservation management server 44 in the service server 4 from a terminal (not shown) installed in the service center, and obtains the face image corresponding to the user ID of the user U0 who requested the lost-item search service. The face image is then displayed on the terminal. In this manner, authentication of the user U0 can be carried out for confirming whether or not the user who came to receive the lost item is the user who made the request.

Figure 11:
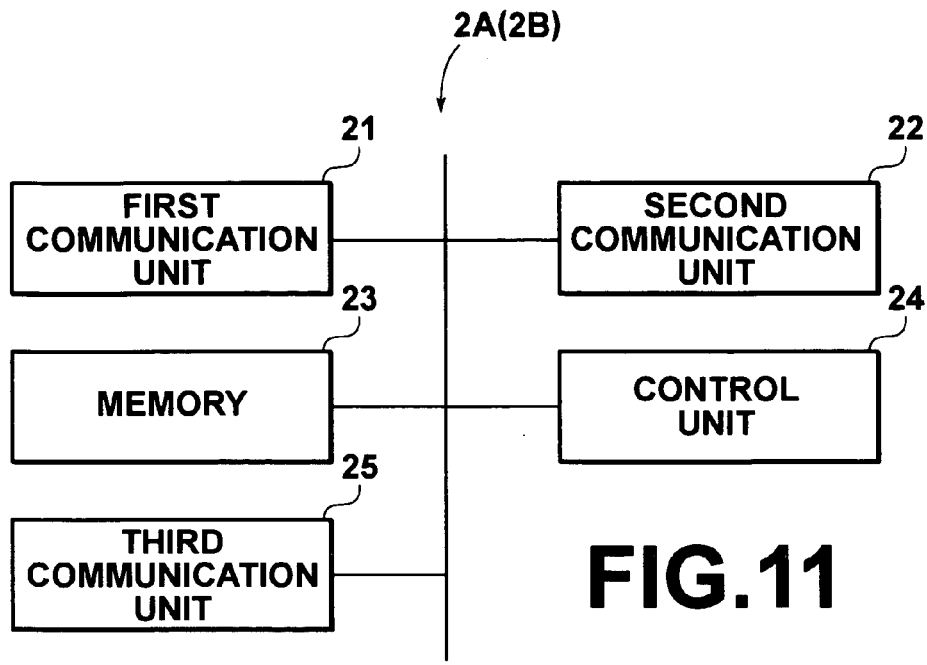
FIG. 11 is a block diagram showing a configuration of a communication apparatus.

FIG. 11 is a block diagram showing a configuration of the communication apparatuses 2A and 2B. Since the configuration is the same for the communication apparatuses 2A and 2B, only the communication apparatus 2A will be described below. As shown in FIG. 11, the communication apparatus 2A comprises a first communication unit 21 for communicating with the wireless tags 30 held by the users U0, a second communication unit 22 for communicating with the PDAs 50 held by the users U0 via a wireless LAN, a memory 23 for storing a program for operating the communication apparatus 2A and various kinds of information such as the specific user ID used at the time of missing child search, a control unit 24 for controlling the communication apparatus 2A, and a third communication unit 25 connected to the network 3.

The first communication unit 21 sends the inquiry signal representing the inquiry information at predetermined intervals, and receives the reply signals from the wireless tags 30.

The reply information represented by each of the reply signals from the wireless tags 30 includes the user ID (identification information) for identifying the corresponding user U0. The control unit 24 sends the user ID from the third communication unit 25 to the service server 4 via the network 3, and obtains the service information to be provided to the user U0. The control unit 24 sends the service information from the second communication unit 22 to the PDA 50 of the user U0.

Figure 12:
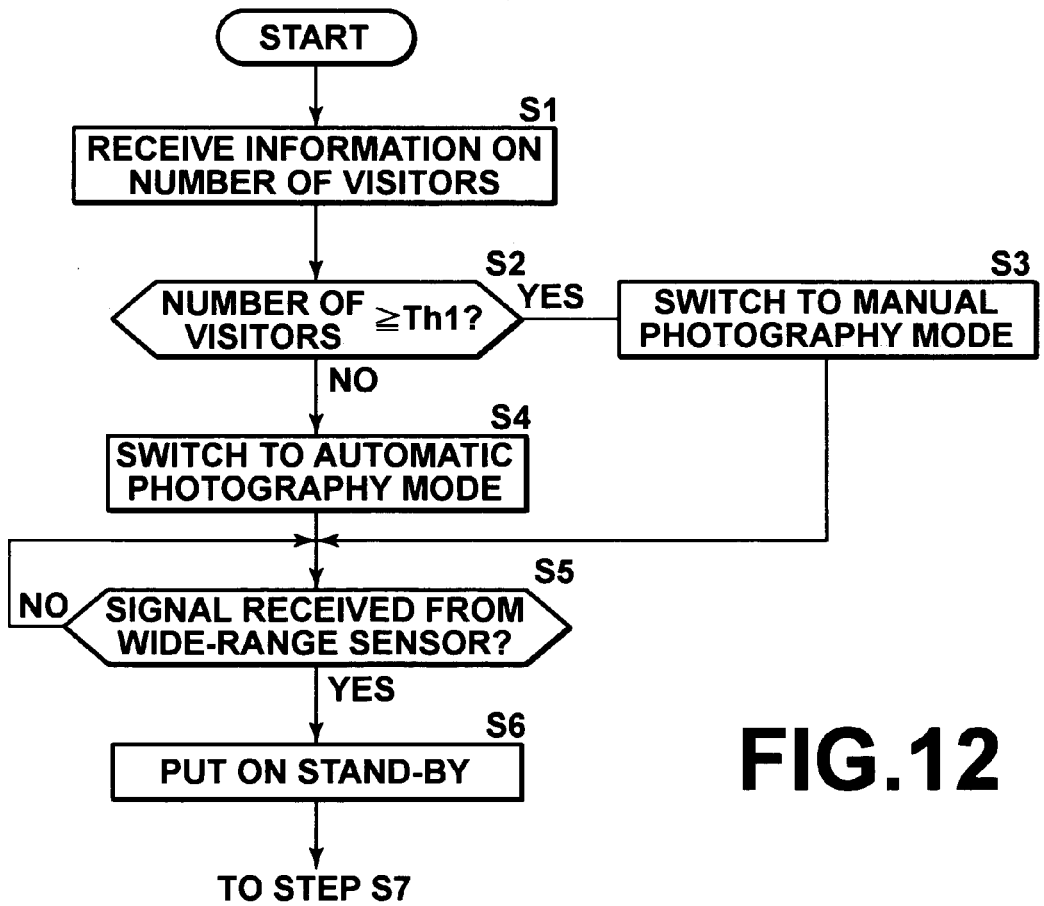
FIG. 12 is a flow chart showing a procedure carried out at the time of photography by the photography system (part 1)
Figure 13:
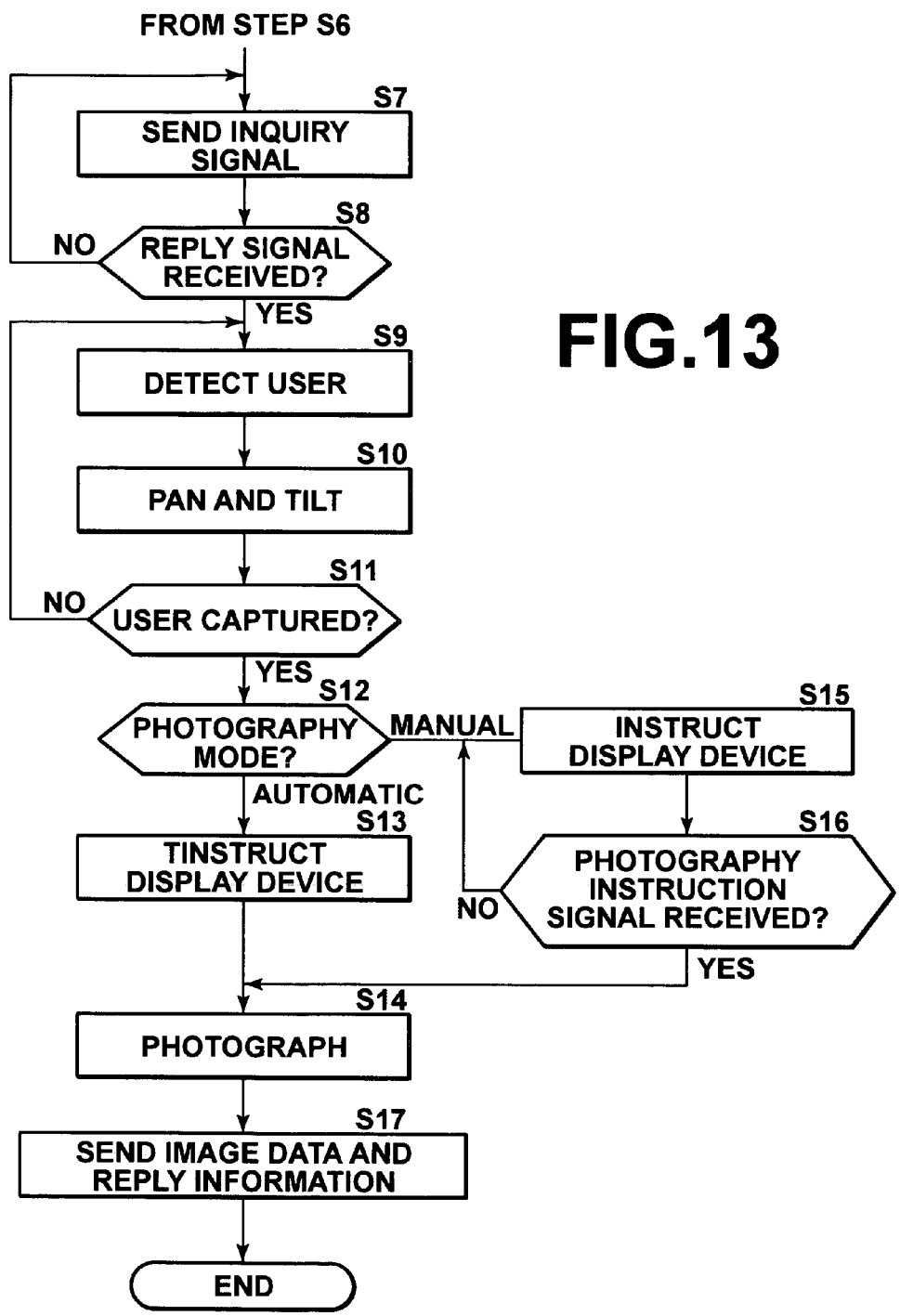
FIG. 13 is a flow chart showing the procedure carried out at the time of photography by the photography system (part 2)

A procedure carried out in this embodiment will be described next. FIGS. 12 and 13 are flow charts representing a procedure carried out in the photography systems 1A and 1B at the time of photography.

The control unit 14D of the photography device 14 is always receiving the information on the number of visitors from the gates 11A and 11B (Step S1), and compares the number with the threshold value Th1 (Step S2). If the number is not smaller than the threshold value Th1 at Step S2, the control unit 14D sets the imaging unit 14A to the manual photography mode (Step S3), and the procedure goes to Step S5. In the case where the number is not smaller than the threshold value Th1 at Step S2, the imaging unit 14A may be set to the manual photography mode or the mode of photography by calling the users U0, as has been described above.

If the number is smaller than the threshold value Th1 at Step S2, the control unit 14D sets the imaging unit 14A to the automatic photography mode (Step S4). The control unit 14D then starts monitoring of whether or not a signal representing reception of the reply signal has been sent from the wide-range sensor 12 (Step S5). If a result at Step S5 is affirmative, the control unit 14D causes the imaging unit 14A to stand by for photography (Step S6).

The control unit 14D causes the communication device 13 to constantly transmit the inquiry signal (Step S7 in FIG. 13), and starts monitoring of whether or not the communication device 13 has received the reply signal from the wireless tag 30 of the user U0 to be photographed in the photography range 5A (Step S8). If a result at Step S8 is affirmative, the control unit 14 causes the human sensors 16A and 16B to detect the user U0 in the photography range 5A (Step S9). The control unit 14D also pans and tilts the imaging unit 14A for capturing the user U0 (Step S10). If the result at Step S8 is negative, the procedure returns to Step S7.

The control unit 14D judges whether or not the imaging unit 14A has captured the user U0 (Step S11). If a result at Step S11 is negative, the procedure returns to Step S9. If the result at Step S11 is affirmative, the control unit 14D judges whether the imaging unit 14A is in the automatic photography mode or the manual photography mode (Step S12).

In the case of automatic photography mode, the control unit 14D displays the instruction for photography on the display device 15 (Step S13), and the imaging unit 14A obtains the image data set S1 by carrying out photography of the user U0 according to timing indicated by the voice of photography instruction from the display device 15 (Step S14).

In the case of manual photography mode, the control unit 14D displays on the display device 15 the instruction to cause the user U0 to press the photography button 33 of his/her wireless tag 30 (Step S15). The control unit 14D starts monitoring of whether or not the communication device 13 has received the photography instruction signal sent from the wireless tag 30 in response to pressing the photography button 33 by the user U0 (Step S16). If a result at Step S16 is affirmative, the procedure returns to Step S14 whereat the imaging unit 14A obtains the image data set S1 by photography.

The control unit 14D sends the image data set S1 and the reply information represented by the reply signal sent from the wireless tag 30 to the service server 4 via the communication unit 14G (Step S17) to end the procedure.

In the service server 4, the image server 42 writes the user ID included in the reply information in the tag of the image data set S1 sent from the photography system 1A. The image server 42 also classifies the image data set S1 according to the user ID.

Figure 14:
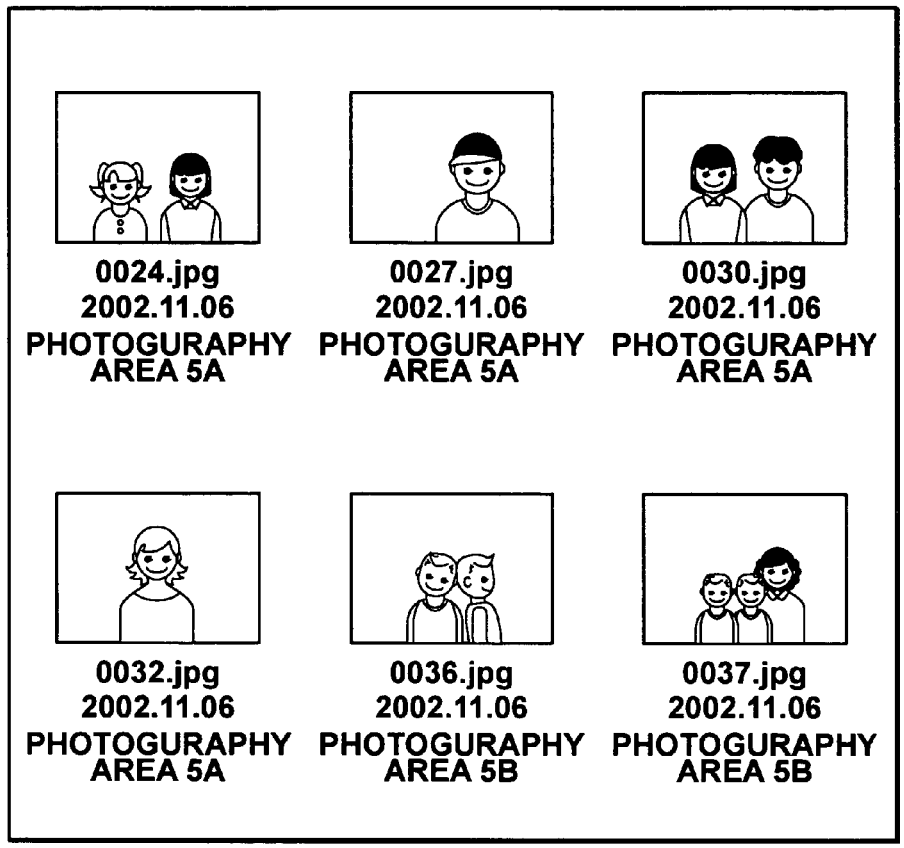
FIG. 14 shows a catalog of thumbnail images.

When the user U0 accesses the service server 4 from the PDA 50, and sends an instruction to the service server 4 to preview the image data sets S1 obtained in the above manner together with the user ID, the image server 42 searches for the image data sets S1 stored therein according to the user ID as a search key. The image server 42 then sends the image data sets S classified by the user ID to the PDA 50, and the image data sets s1 are displayed on the PDA 50. More specifically, a catalog of thumbnail images of the image data sets S1 sorted in order of file names is displayed on the PDA 50, as shown in FIG. 14. The catalog of the thumbnail images includes the file names, the date of photography, and the name of the photography area.

Figure 15:
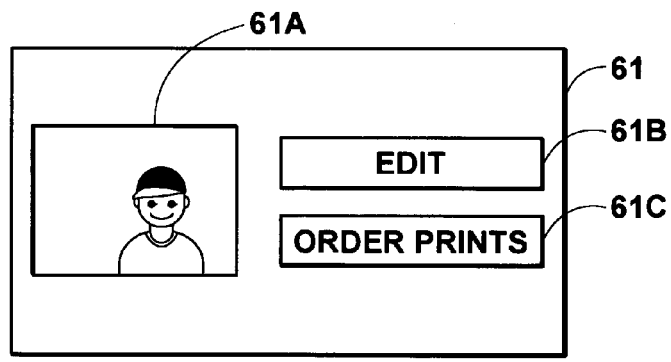
FIG. 15 shows an example of a preview screen.

The user U0 can select any one of the thumbnail images from the catalog for preview thereof. FIG. 15 shows a preview screen 16 displayed on the PDA 50. As shown in FIG. 15, the preview screen 16 includes an image 61A represented by the image data set S1, an Edit button 61B for carrying out editing on the image data set S1 such as image processing, deletion from the service server 4, trimming, and composition with a template, and an Order Prints button 61C for placing a printing order or for attachment to an e-mail message. The user U0 can confirm and edit the images that have been photographed, and place a printing order thereof by using the preview screen 61.

In the case where the user U0 places a printing order from the service server 4, the service server 4 sends to the laboratory 8 the image data set or sets regarding which the order is placed. The laboratory 8 prints the image data set or sets S1 or records the image data set or sets S1 in a CD-R, for example. In the case where the user U0 instructs the service server 4 to send the image data set or sets S1 as attachments to an e-mail message, the image server 42 sends the image data set or sets S1 to an e-mail address specified by the user U0, by attaching the image data set or sets S1 to the e-mail message. In the case where the user U0 instructs the service server 4 to carry out editing such as deletion or image processing on the image data set or sets S1, the image server 42 edits the image data set or sets S1 as specified.

The user U0 can place a printing order and instruct the service server 4 to carry out editing regarding the image data sets S1 on another day, by accessing the service server 4 from the terminal 6 in the same manner as has been described above.

As has been described above, according to this embodiment, the user U0 previews and edits the image data sets S1 photographed in the theme park and places a printing order regarding the image data sets S1, by using the PDA 50 via the communication apparatuses 2A and 2B installed in the theme park. Therefore, without moving around in the theme park, the user U0 can preview and edit the images and places a printing order, by using the PDA 50 held by the user U0.

Figure 16:
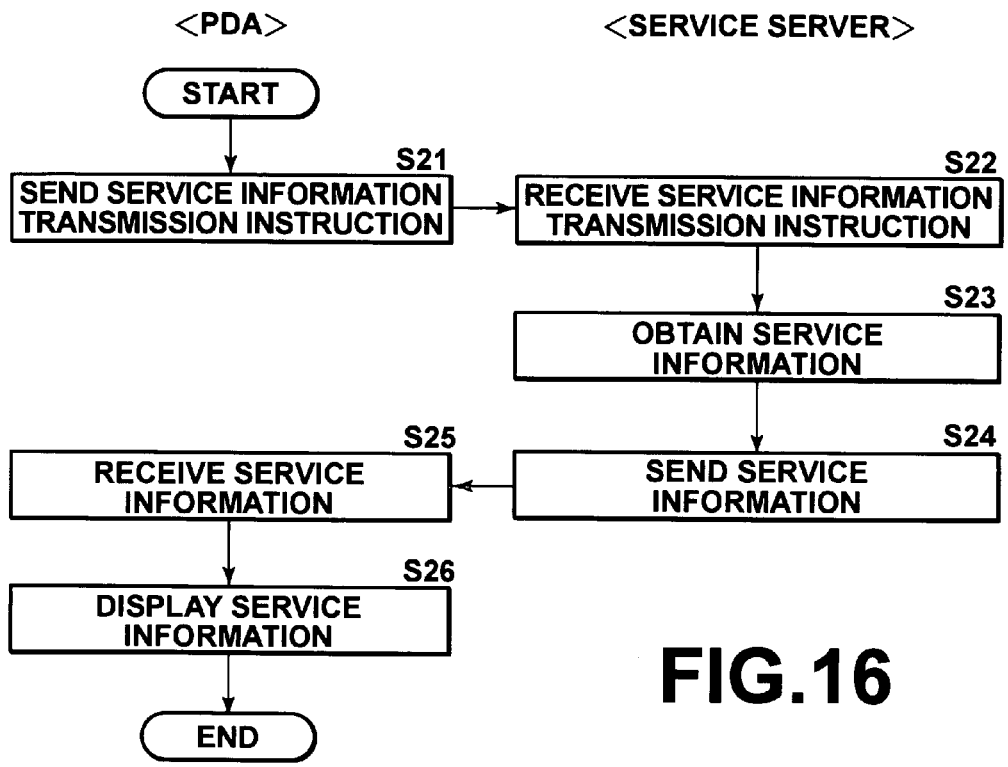
FIG. 16 is a flow chart showing a procedure carried out when a user requests provision of service information.

A procedure carried out when one of the users U0 requests provision of the service information will be described next. FIG. 16 is a flow chart showing the procedure. When the user U0 orders transmission of the desired service information by using the PDA 50, the procedure starts. The PDA 50 sends a transmission instruction regarding the service information (Step S21), and the communication unit 2A or 2B receives the instruction (Step S22). The control unit 46 refers to the memory 45 for obtaining the service information (Step S23), and sends the service information to the PDA 50 of the user U0 in the form of an e-mail message (Step S24). The PDA 50 receives the service information as the e-mail message (Step S25), and displays the e-mail message thereon (Step S26) to end the procedure.

Figure 17:
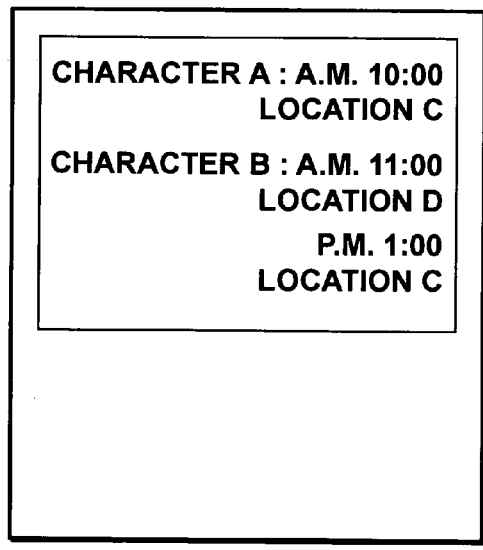
FIG. 17 shows the service information displayed on a PDA.

FIG. 17 shows an example of the service information displayed on the PDA 50. The service information in FIG. 17 is displayed on the PDA 50 in the case where the user U0 has requested the service information on appearance of characters in the theme park. As shown in FIG. 17, the user U0 can understand from the service information that a character A shows up at 10:00 AM in place C, while a character B shows up at 11:00 AM and 1:00 PM in places D and C, respectively.

Figure 18:
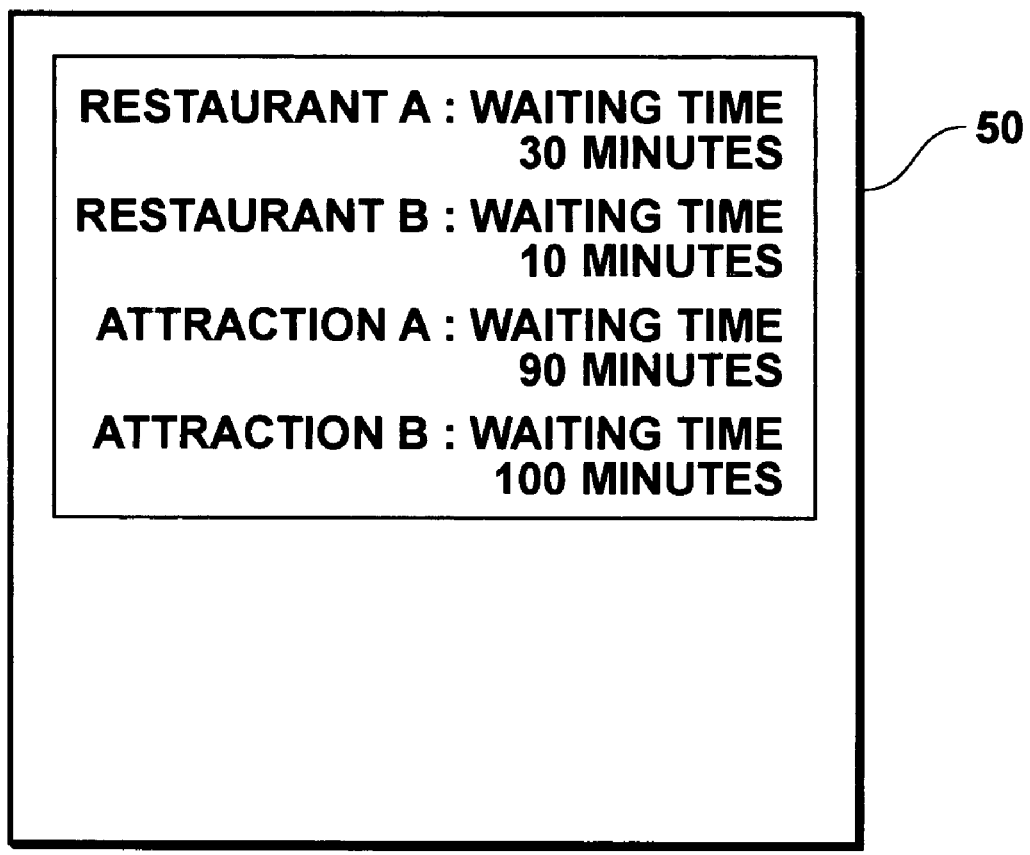
FIG. 18 shows an example of information on waiting time displayed on the PDA.

In the case where the service of display of the waiting time for an attraction or a restaurant is ordered, the service server 4 sends to the PDA 50 the waiting time information managed by the waiting time management server 43. FIG. 18 shows an example of the information on the waiting time displayed on the PDA 50. The user U0 can understand the waiting time for the attraction or the restaurant by viewing the information on the waiting time displayed on the PDA 50 as shown in FIG. 18.

The service information to be provided to the user U0 may be information specific to the user U0. The user U0 has registered the properties thereof at the time of entrance to the theme park. Therefore, with reference to the properties, the service information may be provided to the user U0 such as information on an attraction appropriate for the age of the user U0, information on an event that is popular among children if the user U0 is with his/her child, information on a path of the user U0 in the theme park. The information on the path is found based on the location information of the communication apparatuses 2A and 2B that received the user ID and stored in the memory 45 by being related to the user ID.

Figure 19:
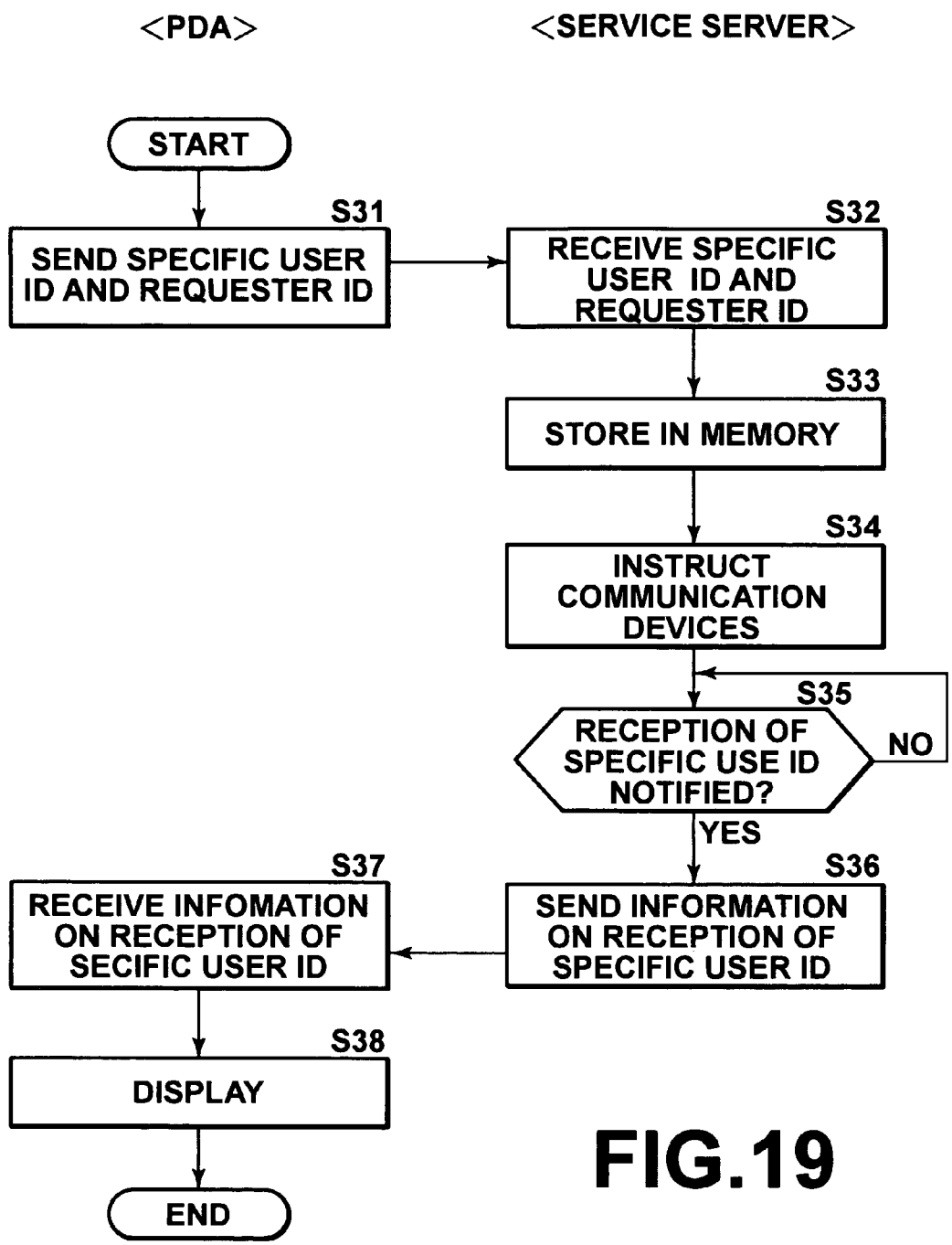
FIG. 19 is a flow chart showing a procedure carried out when a user requests a search for a missing child.

Next will be described a procedure carried out when any one of the users U0 requests a missing child search. FIG. 19 is a flow chart showing the procedure. In this example, the case will be described where the wireless tag 30 is held by a child of the user U0 and the child is missing. When the user U0 instructs the service server 4 to carry out a missing child search by using the PDA 50, the procedure starts. The user U0 sends to the service server 4 the user ID stored in the wireless tag 30 held by the missing child as the specific user ID to be searched for together with the user ID (the requester ID), by using the PDA 50 (Step S31).

The service server 4 receives the specific user ID and the requester ID (Step S32), and the control unit 46 stores the specific user ID and the requester ID in the memory 45 (Step S33). The control unit 46 instructs the communication apparatuses 2A and 2B and the photography systems 1A and 1B to notify the service server 4 of reception of the specific user ID in the case where the communication apparatuses 2A and 2B and the photography systems 1A and 1B receive the specific user ID (Step S34). The control unit 46 starts monitoring of reception of the specific user ID (Step S35).

In the case where a result at Step S35 is affirmative, the control unit 46 refers to the address database and sends an e-mail message informing of reception of the specific user ID to the PDA 50 held by the user U0 represented by the requester ID, together with the location information of either one of the communication apparatuses 2A and 2B or either one of the photography systems 1A and 1B that received the specific user ID (Step S36). The PDA 50 receives the e-mail message including the information representing reception of the specific user ID and the location information of the communication devices 2A or 2B or the photography systems 1A or 1B (Step S37), and displays the information and the location information thereon (Step S38) to end the procedure.

Figure 20:
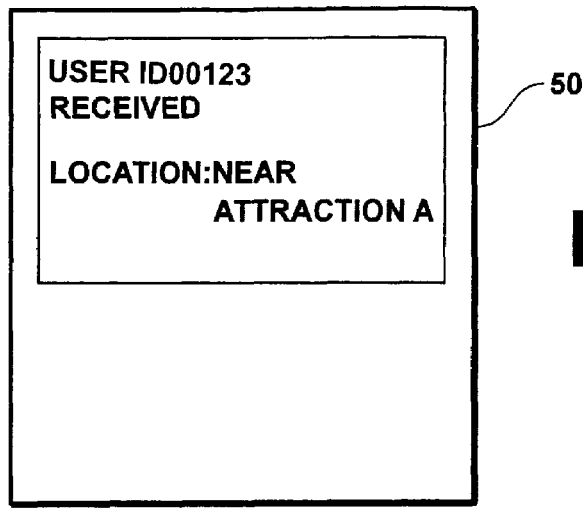
FIG. 20 shows an example of information displayed on the PDA on reception of specific identification information and on a location of the communication apparatus that received the specific identification information.

FIG. 20 shows an example of the information on reception of the specific user ID and the location information displayed on the PDA 50. On the PDA 50 are displayed "User ID 00123 is received" representing the user ID (00123, in this case) stored in the wireless tag 30 held by the missing child and "Location: Near Attraction A" representing the location of the communication apparatus 2A or 2B, or the photography systems 1A or 1B as shown in FIG. 20. The user U0 understands that his/her missing child is near the attraction A, by viewing the message on the PDA 50.

Although the user U0 needs to memorize the user ID, the user U0 can request a search for the wireless tag 30 from the service server 4 in the case where the user U0 lost the wireless tag 30. In this case, the user U0 registers the user ID stored in the lost wireless tag 30 as the specific user ID with the memory 45 in the same manner as in the case of missing child search.

Figure 21:
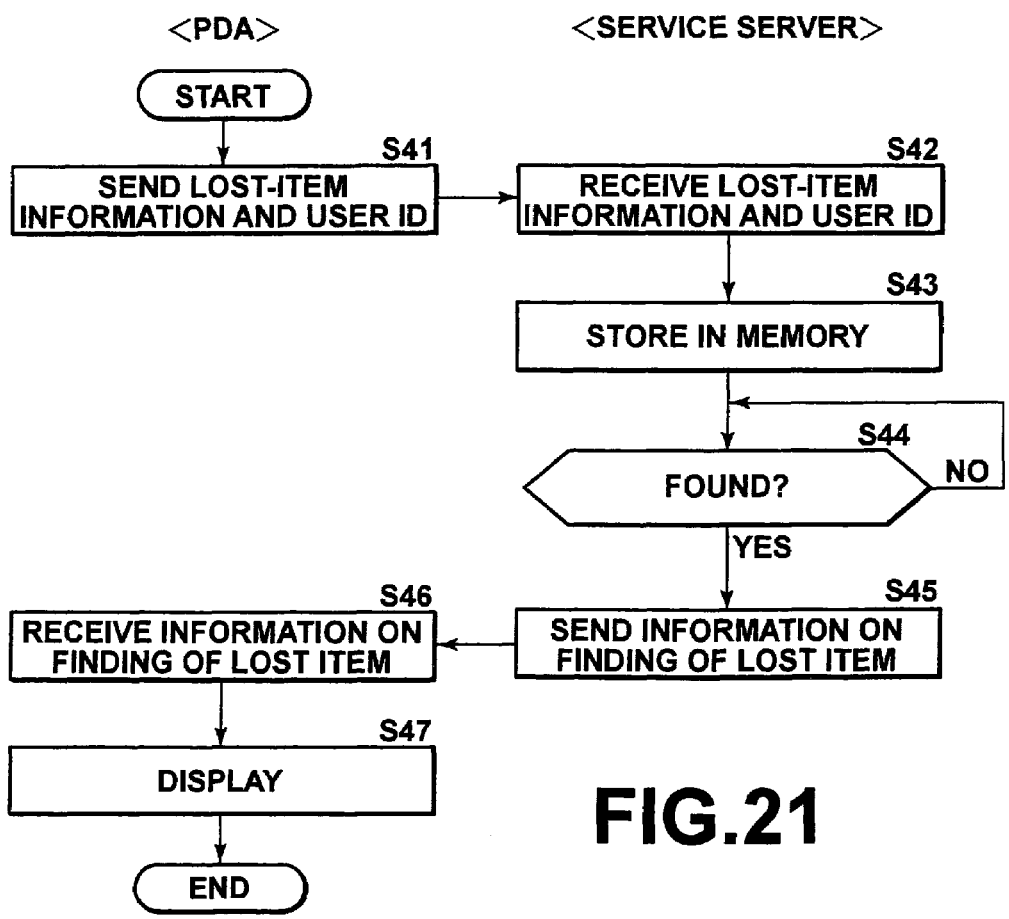
FIG. 21 is a flow chart showing a procedure carried out when a user requests a search for a lost item.

Next will be described a procedure carried out in the case where any one of the users U0 requests the service for finding a lost item. FIG. 21 is a flow chart showing the procedure. When the user U0 instructs the service server 4 to search for the lost item by using the PDA 50, the procedure starts. The user U0 sends lost-item information representing the lost item from the PDA 50 to the service server 4, together with the user ID thereof (Step S41).

The service server 4 receives the lost-item information and the user ID (Step S42), and the control unit 46 stores the information in the memory 45 together with the user ID and the information representing whether or not the lost item has been found (Step S43). The control unit 46 regularly refers to the lost-item information stored in the memory 45, and monitors whether or not the information shows that the lost item has been found (Step S44). If a result at Step S44 is affirmative, the control unit 46 refers to the address database and sends an e-mail message including information of the finding to the PDA 50 held by the user U0 who sent the lost-item information (Step S45). The PDA 50 receives the e-mail message notifying the finding (Step S46), and displays the message (Step S47) to end the procedure.

Figure 22:
FIG. 22 shows and example of information displayed on the PDA for representing that the lost item has been found.

FIG. 22 shows an example of the information representing the finding displayed on the PDA 50. The message "Your lost item has been found. Please come to service center to retrieve it." is displayed on the PDA 50. The user U0 views the message displayed on the PDA 50, and can visit the service center to retrieve his/her lost item.

When the user U0 retrieves the lost item, a clerk in the service center refers to the reservation management server 44 in the service server 4 by using the terminal (not shown), and displays the face image corresponding to the user ID of the user U0 who requested the search service read from the reservation management server 44. In this manner, the clerk can authenticate the user U0 who came to receive the lost item as the user U0 who requested the search service. This authentication may be carried out by comparing the user ID stored in the wireless tag 30 held by the user U0 who came to receive the item with the user ID of the user U0 who requested the search service.

In this example, the service server 4 sends the information representing the finding to the PDA 50 when the lost item has been found. However, the PDA 50 may regularly access the service server 4 so that the user U0 can confirm whether or not the lost item has been found by referring to the information stored in the memory 45.

Figure 23:
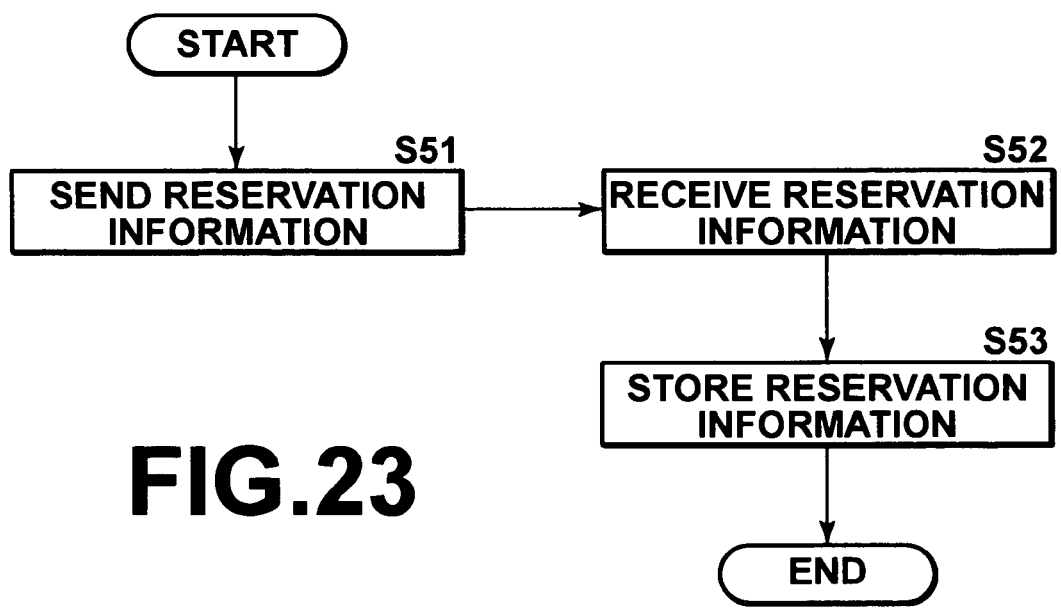
FIG. 23 is a flow chart showing a procedure carried out at the time of reservation of a restaurant.

A procedure carried out at the time of reservation of a restaurant will be described next. FIG. 23 is a flow chart showing the procedure. When the user U0 instructs the service server 4 to reserve a restaurant by using the PDA 50, the procedure starts. The user U0 sends reservation information including the name of the restaurant, the number of people, the time for reservation, and the user ID to the service server 4 by using the PDA 50 (Step S51).

The service server 4 receives the reservation information (Step S52), and the reservation management server 44 manages the reservation information (Step S53) to end the procedure.

When the reserved time comes, the user U0 visits the restaurant and shows his/her user ID to the restaurant. A clerk in the restaurant sends the user ID of the user U0 to the service server 4 from the terminal 7A. The reservation management server 44 in the service server 4 judges whether or not the reservation information stored therein includes the user ID that has been sent thereto. In this manner, the user U0 who made the reservation can be authenticated as the user U0 who arrived at the restaurant, and this result is sent to the terminal 7A. The reservation management server also sends the face image of the user U0 corresponding to the user ID to the terminal 7A. In this manner, the clerk can easily confirm whether or not the user U0 who made the reservation is the user U0 who came to visit the restaurant.

In the above-described embodiment, the image data sets S1, the service information, and the like are sent to the PDA 50 held by the user U0 while a request for a missing child search or the like is sent from the PDA 50. However, a mobile phone or a small notebook computer may be used instead of the PDA 50.

In the embodiment described above, the information such as the service information, the information on reception of the specific user ID, and the information on finding of the lost item is displayed on the PDA 50 in the form of characters. However, the information may be output in the form of voice. Alternatively, the characters may be used together with the voice.

What is claimed is:

1. An image management system comprising:

photography means for receiving identification information sent from identification information transmission means and for obtaining an image by photographing a customer visiting a facility wherein the customer is detected by a sensor in a specified location, the identification information transmission means being held by the customer and transmitting the identification information for identifying the customer;

image management means for storing the image obtained by the photography means by relating the image to the identification information and for carrying out management of the image including at least one of editing, transmission, and printing of the image, the image management means being connected to the photography means;

a plurality of communication means installed in a plurality of places in the facility, for sending and receiving various kinds of information including the image and the identification information by communicating by radio with a mobile terminal that carries out at least one of editing of the image, ordering editing of the image, and placing a printing order for the image while being held by the customer, the mobile terminal including display means for receiving the identification information sent from the identification information transmission means and for displaying various kinds of information including the image and terminal communication means for sending and receiving the various kinds of information including the image by radio; and control means for controlling the image management means and the communication means so that the management of the image stored in the image management means is carded out according to an instruction from the mobile terminal, wherein the photography means is temporarily suspended in a particular photography range if the number of customers physically located in the particular photography range sensed by the sensor is above a predetermined threshold number of customers.

2. The image management system according to claim 1 further comprising a service information storage means for storing service information on various kinds of services to be provided to the customer, wherein the control means also controls the service information storage means and the communication means so that the service information related to any part of the services desired by the customer is obtained from the service information storage means in response to an instruction from the mobile terminal and the service information is sent to the mobile terminal that sent the instruction.

3. The image management system according to claim 2, wherein the service information includes at least one of information for guiding the facility, information on congestion of an attraction or a restaurant in the facility, information necessary for reserving the attraction or the restaurant, information on time and location of character appearance in the facility, and information on a path of the customer in the facility.

4. The image management system according to claim 1 further comprising a specific identification information registration means for registering specific identification information specified by the customer and sent from the mobile terminal, wherein, if any one of the communication means or the photography means receives the specific identification information, the control means controls the communication means so as to send information on the reception of the specific identification information to the mobile terminal that sent the specific identification information, together with location information representing a location of the communication means or the photography means that received the specific identification information.

5. The image management system according to claim 1 further comprising a lost-item registration means for registering lost-item information representing a lost item of the customer sent from the mobile terminal by relating the lost-item information to the identification information of the customer together with information on whether or not the lost item has been found, wherein, if the lost item is found, the control means controls the communication means so as to send information representing the finding to the mobile terminal that sent the lost-item information.

6. The image management system according to claim 1, wherein the image management means carries out at least one of image enhancement processing on the image, deletion of the image if the image is unnecessary, and attachment of the image to an e-mail message as the editing of the image.

7. The image management system according to claim 1, wherein the mobile terminal is a PDA, or a mobile phone, or a notebook computer.

8. The image management system according to claim 1, wherein the identification information transmission means is a wireless tag.

9. an image management system comprising:
a photography device for receiving identification information sent from an identification information transmission device and for obtaining an image by photographing a customer visiting a facility wherein the customer is detected by a sensor in a specified location, the identification information transmission device being held by the customer and transmitting the identification information for identifying the customer;
an image management device for storing the image obtained by the photography device according to corresponding identification information; the image management device, being connected to the photography device, carries out management of the image including editing, transmitting, and printing of the image;
a communication device installed in the facility, for sending and receiving various kinds of information including the image and the identification information by communicating by radio with a mobile terminal wherein the mobile terminal:
carries out at least one of editing of the image, ordering editing of the image, and placing a printing order for the image while being held by the customer,
includes a display device for receiving the identification information sent from the identification information transmission device and for displaying various kinds of information including the image and a user interface that allows performance of image management including editing, transmitting, and printing of the image,
includes a terminal communication device for sending and receiving the various kinds of information including the image by radio; and
a control device for controlling the image management device and the communication device so that the management of the image stored in the image management device is carried out according to an instruction from the mobile terminal, wherein the photography device is temporarily suspended in a particular photography range if the number of customers physically located in the particular photography range sensed by the sensor is above a predetermined threshold number of customers.

10. The image management system according to claim 9 further comprising a service information storage device for storing service information on various kinds of services to be provided to the customer, wherein the control device also controls the service information storage device and the communication device so that the service information related to any part of the services desired by the customer is obtained from the service information storage device in response to an instruction from the mobile terminal and the service information is sent to the mobile terminal that sent the instruction.

11. The image management system according to claim 9, wherein the mobile terminal is a PDA, or a mobile phone, or a notebook computer.

12. The image management system according to claim 10, wherein the service information includes at least one of information for guiding the facility, information on congestion of an attraction or a restaurant in the facility, information necessary for reserving the attraction or the restaurant, information on time and location of character appearance in the facility, and information on a path of the customer in the facility.

13. The image management system according to claim 9 further comprising a specific identification information registration device for registering specific identification information specified by the customer and sent from the mobile terminal, wherein, if the communication device or the photography device receives the specific identification information, the control device controls the communication device so as to send information on the reception of the specific identification information to the mobile terminal that sent the specific identification information, together with location information representing a location of the communication device or the photography device that received the specific identification information.

14. The image management system according to claim 9 further comprising a lost-item registration device for registering lost-item information representing a lost item of the customer sent from the mobile terminal by relating the lost-item information to the identification information of the customer together with information on whether or not the lost item has been found, wherein, if the lost item is found, the control device controls the communication device so as to send information representing the finding to the mobile terminal that sent the lost-item information.

15. The image management system according to claim 9, wherein the image management device carries out at least one of image enhancement processing on the image, deletion of the image if the image is unnecessary, and attachment of the image to an e-mail message as the editing of the image.

16. The image management system according to claim 9, wherein the identification information transmission device is a wireless tag.

17. The image management system of claim 9, wherein the photography means is temporarily suspended in the particular photography range if the number of customers physically located in the particular photography range sensed by the sensor is above a predetermined threshold of number of customers.

* * * * *